United States Patent
Hwang et al.

(10) Patent No.: US 11,241,943 B2
(45) Date of Patent: Feb. 8, 2022

(54) SUN VISOR STORED IN A VEHICLE ROOF

(71) Applicants: HYUNDAI MOTOR COMPANY, Seoul (KR); KIA MOTORS CORPORATION, Seoul (KR); Yong San Co., Ltd., Ulsan (KR)

(72) Inventors: Jin Ho Hwang, Seoul (KR); Dae Ig Jung, Suwon-si (KR); Seung Hyeok Chang, Suwon-si (KR); Min Ho Cho, Suwon-si (KR); Hyung Jin Kim, Seoul (KR); Sang Hoon Lee, Cheonan-si (KR)

(73) Assignees: HYUNDAI MOTOR COMPANY, Seoul (KR); KIA MOTORS CORPORATION, Seoul (KR); Yong San Co., Ltd., Ulsan (KR)

( * ) Notice: Subject to any disclaimer, the term of this patent is extended or adjusted under 35 U.S.C. 154(b) by 119 days.

(21) Appl. No.: 16/687,317

(22) Filed: Nov. 18, 2019

(65) Prior Publication Data
US 2020/0369126 A1    Nov. 26, 2020

(30) Foreign Application Priority Data
May 23, 2019    (KR) ........................ 10-2019-0060901

(51) Int. Cl.
*B60J 3/02*    (2006.01)
*B60R 7/04*    (2006.01)

(52) U.S. Cl.
CPC ........... *B60J 3/0243* (2013.01); *B60J 3/0239* (2013.01); *B60R 7/04* (2013.01)

(58) Field of Classification Search
CPC ......... B60J 3/0213; B60J 3/0234; B60J 3/243
USPC .......................................................... 296/97.8
See application file for complete search history.

(56) References Cited

U.S. PATENT DOCUMENTS

| 7,077,454 | B1 * | 7/2006 | Schambre | .............. B60J 3/0208 296/214 |
| 7,275,778 | B2 * | 10/2007 | Asai | ....................... B60J 3/0204 296/97.11 |
| 2006/0279101 | A1 * | 12/2006 | Sahara | ....................... B60J 3/02 296/97.8 |
| 2012/0212884 | A1 * | 8/2012 | Su | .......................... F16B 2/245 361/679.01 |

FOREIGN PATENT DOCUMENTS

KR    200263755    2/2002

* cited by examiner

*Primary Examiner* — Joseph D. Pape
(74) *Attorney, Agent, or Firm* — Lempia Summerfield Katz LLC (57) ABSTRACT

A roof-storage-type sun visor includes a housing located inside a roof of a vehicle. The housing has a storage recess therein and a sun visor unit configured to be disposed along the storage recess. The sun visor unit includes a sun visor located so as to correspond to a windshield glass and includes multi-stage rails located at opposite sides of the sun visor. The sun visor is configured to be withdrawn outside the storage recess along the multi-stage rails.

13 Claims, 7 Drawing Sheets

[ GRAVITY HOOK UNOPERATED ]    [ GRAVITY HOOK CAUGHT ]

FIG. 8B

SUN VISOR STORED IN A VEHICLE ROOF

CROSS-REFERENCE TO RELATED APPLICATION

This application claims, under 35 U.S.C. § 119(a), the benefit of priority to Korean Patent Application No. 10-2019-0060901 filed on May 23, 2019, the entire contents of which are incorporated herein by reference.

BACKGROUND

(a) Technical Field

The present disclosure relates to a roof-storage-type sun visor, and more particularly to a roof-storage-type sun visor including a sun visor configured to be inserted into a housing, which has a storage recess formed in one end thereof that faces a windshield glass, wherein the sun visor is stored inside a roof in response to a user request.

(b) Background Art

In general, a sun visor is a panel or pad-type driving assistant component mounted above a driver's seat for blocking sunlight radiated from the front or the side of the driver's seat, which may negatively affect driving. A sun visor is also mounted for the passenger seat next to the driver as well as for the driver's seat.

Figure 1:
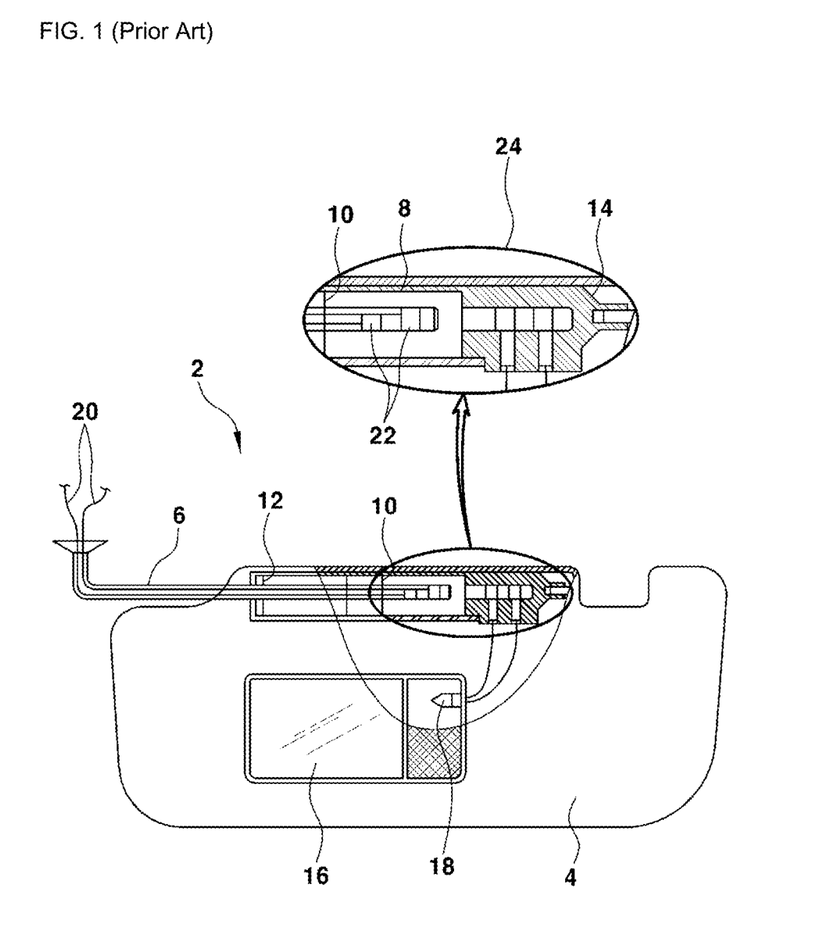
FIG. 1 is a view showing a conventional sun visor located at an upper portion of an inner surface of a windshield glass.

In a conventional sun visor 2 shown in FIG. 1, a mirror 16 is attached to the front surface of a body 4 for the convenience of a driver. A lighting means 18 is provided such that the driver may look at himself/herself using the mirror at night.

However, such a lighting means is used only for throwing light on the driver and thus acts as a factor that deteriorates the quality of high-priced vehicles.

Also, when the sun visor is positioned to be exposed to the interior of a vehicle, the possibility of damage to the sun visor is high.

The information disclosed in this Background section is provided only for enhancement of understanding of the background of the disclosure and therefore it may contain information that does not form the prior art that is already known in this country to a person having ordinary skill in the art.

SUMMARY OF THE DISCLOSURE

The conventional sun visor including the lighting means does not include a portable-device-holding means for improving user convenience.

As a result, the conventional sun visor does not satisfy user demand or convenience.

The present disclosure has been made in an effort to solve the above-described problems associated with the prior art.

It is an object of the present disclosure to provide a sun visor capable of being stored in a space defined between a roof lining and a roof panel.

It is another object of the present disclosure to provide a roof-storage-type sun visor configured such that a sun visor is easily moved in a longitudinal direction or is easily turned.

The objects of the present disclosure are not limited to those described above. The objects of the present disclosure should be clearly understood from the following description and could be implemented by means defined in the claims and a combination thereof.

In one aspect, the present disclosure provides a roof-storage-type sun visor apparatus. The sun visor apparatus includes a housing located inside a roof of a vehicle. The housing has a storage recess therein. A sun visor unit is configured to be disposed along the storage recess. The sun visor unit includes a sun visor located so as to correspond to a windshield glass and includes multi-stage rails located at opposite sides of the sun visor. The sun visor is configured to be withdrawn outside the storage recess along the multi-stage rails.

The roof-storage-type sun visor apparatus may further include at least one elastic member located at the inner surface of the housing that faces one end of the sun visor.

The roof-storage-type sun visor apparatus may further include at least one roller unit located at the inner surface of the housing at the position thereof that faces the sun visor.

Each of the multi-stage rails may include a first rail configured to be moved in a longitudinal direction of the housing and a second rail fixed to the sun visor. The second rail may be located between the first rail and the inner surface of the housing and the second rail may be configured to extend along the first rail.

The second rail may be configured to be moved integrally with the sun visor along a first hole provided in the first rail.

The second rail may be provided at one end thereof with a central shaft configured to extend through the sun visor. The sun visor may be configured to be turned about the central shaft.

The central shaft may have a stopper configured such that the sun visor is turned by a predetermined angle.

The roof-storage-type sun visor apparatus may further include a fixing unit located at one end of the first rail that faces the storage recess. The fixing unit may be configured to fix the first rail to one end of the inside of the storage recess.

The roof-storage-type sun visor apparatus may further include a hook unit located at the housing. The hook unit may be configured to be fastened to at least a portion of each of the multi-stage rails.

The hook unit may include a fastening part configured to be fastened to each of the multi-stage rails, an elastic part configured to provide uniform elastic force to the fastening part, and an inclined part located at the fastening part. The inclined part may be configured to abut at least a portion of the sun visor. In the case in which one end of the sun visor contacts the inclined part, the coupling between the fastening part and the multi-stage rail may be released.

The housing may include an upper housing and a lower housing. The lower housing may form a roof lining.

The roof-storage-type sun visor apparatus may further include a holding unit located at one surface of the sun visor for holding a portable device.

Other aspects and embodiments of the disclosure are discussed hereinbelow.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example, both gasoline-powered and electric-powered vehicles.

The above and other features of the disclosure are discussed hereinbelow.

BRIEF DESCRIPTION OF THE DRAWINGS

The above and other features of the present disclosure are described in detail below with reference to certain embodiments thereof illustrated in the accompanying drawings, which are given hereinbelow by way of illustration only, and thus are not limitative of the present disclosure, and wherein.

It should be understood that the appended drawings are not necessarily to scale and present a somewhat simplified representation of various features illustrative of the basic principles of the disclosure. The specific design features of the present embodiments as disclosed herein, including, for example, specific dimensions, orientations, locations, and shapes, can be determined in part by the particular intended application and use environment.

In the figures, reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. However, the present disclosure may be embodied in many different forms and should not be construed as limited to the embodiments set forth herein. Rather, these embodiments are provided so that this disclosure will be thorough and complete, and will fully convey the scope of the disclosure to those having ordinary skill in the art.

In addition, the term "unit" or "assembly" used herein signifies one unit that processes at least one function or operation, and may be realized by hardware, software, or a combination thereof.

In addition, relational terms, such as "first" and "second," are used in this specification only to distinguish between the same elements. The elements are not limited to the sequence therebetween in the following description.

Referring to FIGS. 2-8B, a sun visor unit according to the present disclosure includes a sun visor 200, multi-stage rails 140 and 150, and a central shaft 220 (shown in FIG. 5A), about which the sun visor 200 is turned. The sun visor unit is defined as a superordinate concept including a sun visor located inside a housing and all components configured to drive the sun visor.

Figure 2:
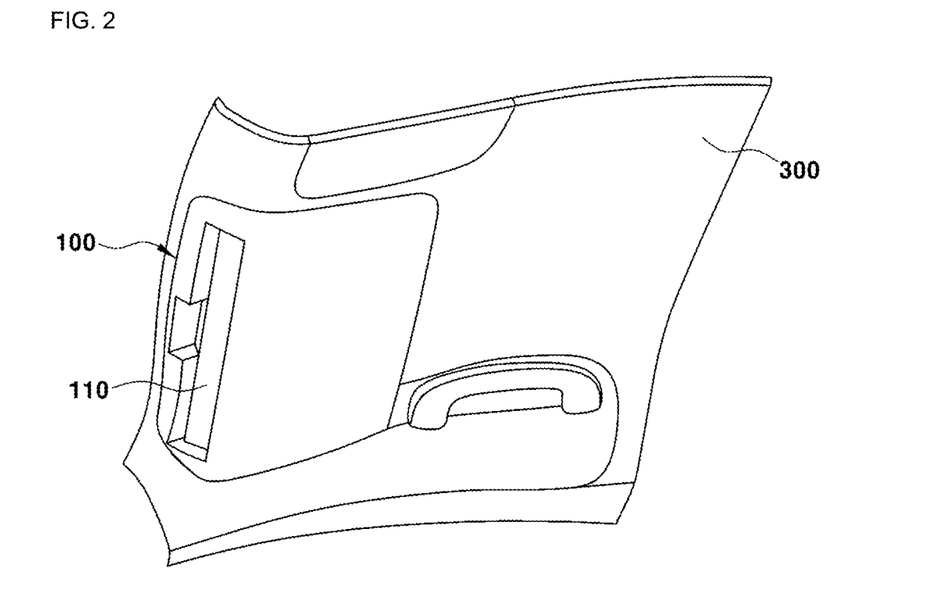
FIG. 2 is a view showing the construction of a roof, in which a roof-storage-type sun visor apparatus according to an embodiment of the present disclosure is located.
Figure 3:
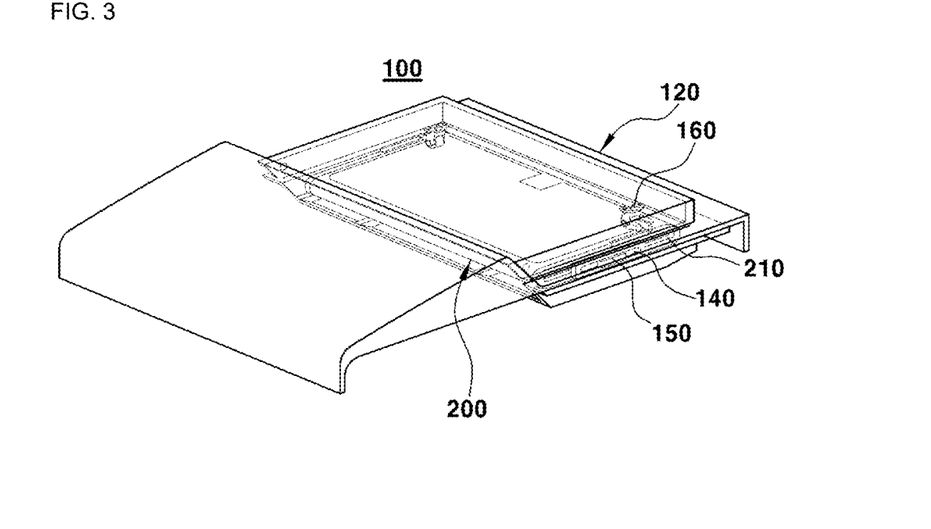
FIG. 3 is a perspective view showing the construction of the roof-storage-type sun visor apparatus according to an embodiment of the present disclosure.
Figure 4:
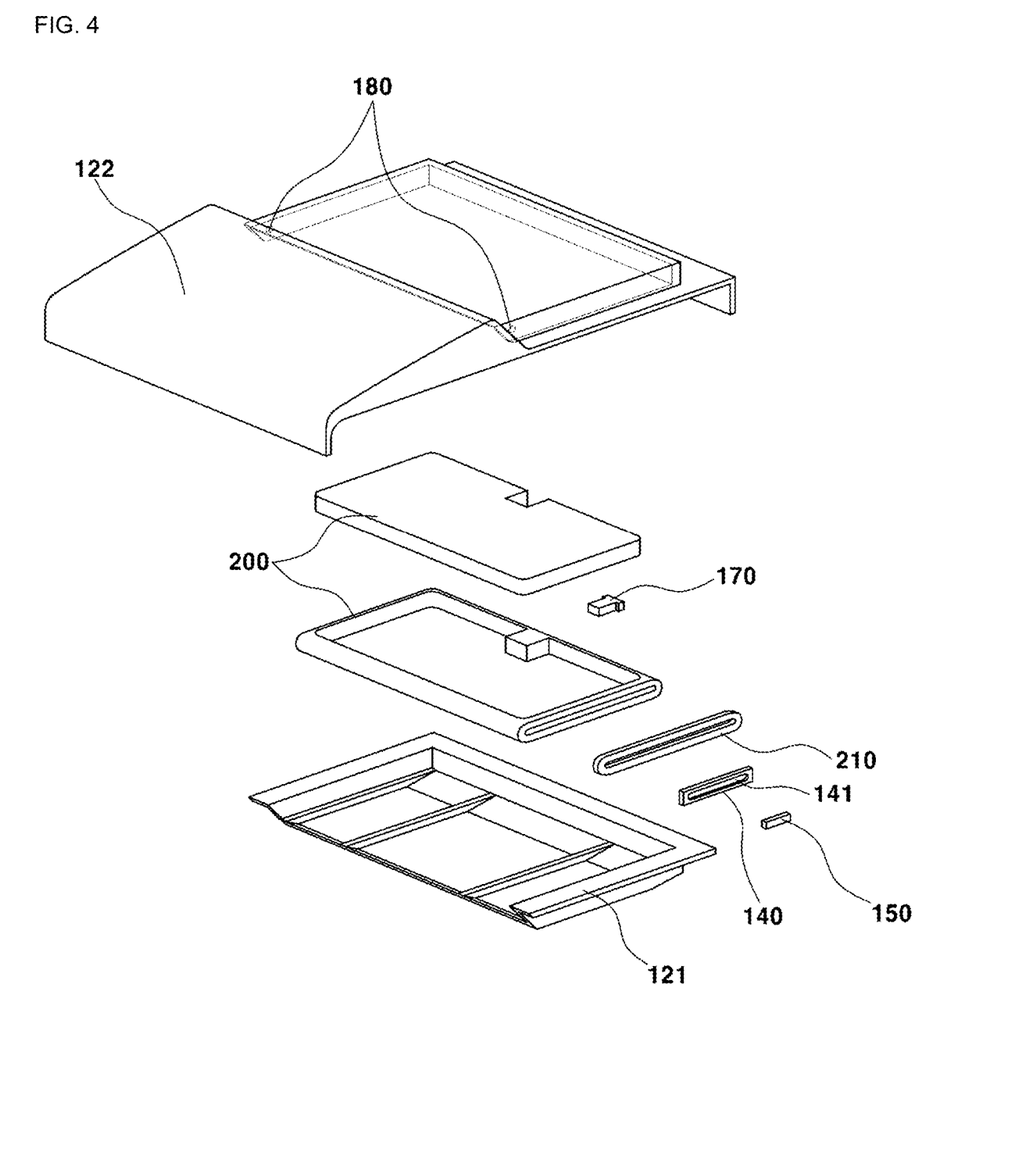
FIG. 4 is an exploded view showing the construction of the roof-storage-type sun visor apparatus according to an embodiment of the present disclosure.

FIG. 2 is a view showing a roof, i.e., a vehicle roof, in which a roof-storage-type sun visor 100, i.e., a sun visor apparatus, according to an embodiment of the present disclosure is located. FIG. 3 is a perspective view showing the construction of the roof-storage-type sun visor, which is retracted into the roof. FIG. 4 is an exploded view showing the construction of the roof-storage-type sun visor 100.

Referring to FIGS. 2-4, the roof-storage-type sun visor 100 includes a sun visor 200 received in a storage recess 110 formed in the roof. A housing 120, which has therein the storage recess 110, may be located inside the roof. Furthermore, at least one roof-storage-type sun visor 100 may be provided adjacent to a windshield glass 300 of the vehicle.

The housing 120 may include an upper housing 122 and a lower housing 121. The upper housing 122 may be mounted so as to be fixed to the roof panel. The lower housing 121 may form a roof lining, whereby the roof exposed to the interior of the vehicle has a unified design.

The housing 120 is configured to include a storage recess 110, which is located at the front end of the roof. The sun visor 200 is configured to be retracted into the storage recess 110, which is located at the front end of the roof. The sun visor 200 is configured to be withdrawn, spread, and turned in the state of being adjacent to the windshield glass 300 in response to a user request.

The storage recess 110 is configured such that a user manually withdraws the sun visor 200 therefrom. One end of the sun visor 200 may be located at substantially the same position as the storage recess 110.

The sun visor 200 is configured to be withdrawn through the storage recess 110, which is adjacent to the windshield glass 300. The sun visor 200 is also configured to be turned so as to correspond to the windshield glass 300.

The sun visor 200 may be provided at one side thereof with a holding unit for holding a user's portable device. The holding unit may be configured such that elastic force is applied to at least one of an upper holding unit or a lower holding unit.

The sun visor 200 is configured to have a flat shape and is configured to protrude from the storage recess 110 along the multi-stage rails 140 and 150, which are located at opposite sides of the sun visor.

In one example, each side of the sun visor 200 is fixed to the second rail 150. The first rail 140 is located between the sun visor 200 and the second rail 150 and the first rail 140 is configured to be moved forwards and rearwards in the longitudinal direction of the housing 120.

Figure 7:
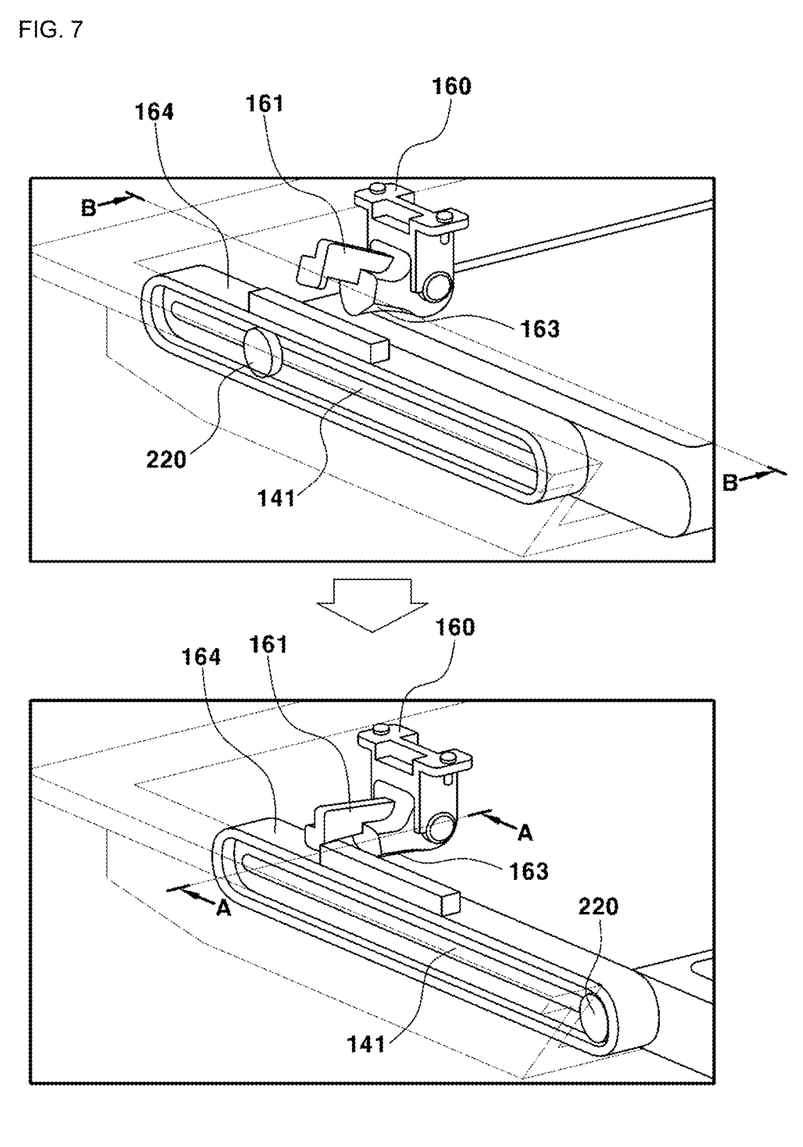
FIG. 7 is an assembly view showing a housing, in which a hook unit according to an embodiment of the present disclosure is located.

The first rail 140 is provided in one end thereof facing the second rail 150 with a first hole 141 (shown in FIG. 7). A rod for fixing the second rail 150 and the sun visor 200 extends through the first hole 141.

When the first rail 140 is moved to one end of the housing 120 adjacent to the storage recess 110 such that the sun visor 200 is withdrawn out of the housing 120, the first rail 140, the second rail 150, and the sun visor 200 are simultaneously moved. When the first rail 140 is fixed in the state of facing the inner surface of the housing 120 adjacent to the storage recess 110, the second rail 150 and the sun visor 200 are further moved along the first hole 141 in the direction in which the sun visor 200 is withdrawn.

At a region at which the first rail 140 and the inner surface of the storage recess 110 face each other, a fixing unit 180 is provided. The fixing unit 180 is configured to fix the first rail 140. When the sun visor 200 protrudes outside the housing 120, the fixing unit 180 prevents the movement of the first rail 140 located inside the housing 120.

In an embodiment of the present disclosure, the fixing unit 180 is realized by a magnetic body. Consequently, the fixing unit 180 may be magnetically coupled to the first rail 140. When force for retracting the sun visor 200 into the storage recess 110 is applied to the sun visor 200, the coupling between the fixing unit 180 and the first rail 140 may be released.

The housing 120 may be provided at each of the upper and lower surfaces thereof with a roller unit 190 (shown in FIG. 5A), which is disposed so as to face the sun visor 200 in order to move the sun visor 200 in the longitudinal direction thereof. At least one roller unit 190 may be provided at each of the upper and lower inner surfaces of the housing 120.

Furthermore, the housing 120 is provided at one end of the rear thereof with an elastic member 170 for pushing the sun visor 200 forwards in response to a user request. In order to withdraw the sun visor 200, the user may push the sun visor 200 in the rearward direction of the vehicle such that the fixation of the elastic member 170 is released.

The elastic member 170 is configured to apply elastic force to the rear end of the sun visor 200 such that the fixation between the rear end of the sun visor 200 and the elastic member 170 is released in response to a user request. The elastic member 170 is further configured to apply tensile force to the sun visor 200 such that at least a portion of the sun visor 200 protrudes outside the storage recess 110 in the case in which the fixation is released.

In one example, in the case in which the elastic member 170 applies elastic force in order to protrude at least a portion of the sun visor 200, the roller unit 190 is located in order to more easily move the sun visor 200.

The withdrawn sun visor 200 is located at the second rail 150, and is turned about the central shaft 220, which extends through the sun visor 200. In one embodiment, the central shaft 220 is located at one end of the second rail 150, which is located at each side of the sun visor 200, such that the sun visor 200 is turned about the central shaft 220. The central shaft 220 is provided with at least one stopper 230 (shown in FIG. 5D) for limiting the turning angle of the sun visor 200.

Figure 5A:
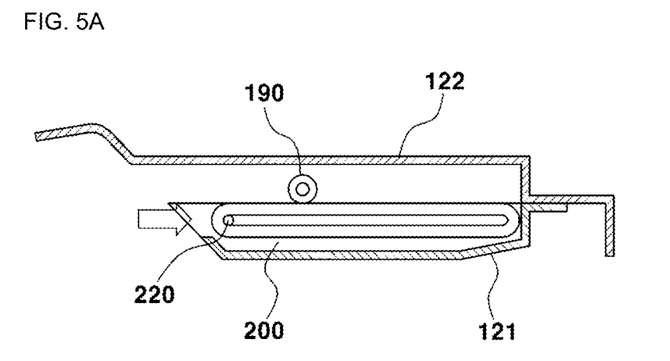
FIG. 5A is a side sectional view showing the roof-storage-type sun visor apparatus according to an embodiment of the present disclosure and in the state in which the sun visor is retracted.

FIG. 5A is a side sectional view showing the roof-storage-type sun visor 100 according to an embodiment of the present disclosure and in the state in which the sun visor 200 is retracted.

As shown, the roof-storage-type sun visor 100 is located at the roof and includes the storage recess 110, which is provided at one end thereof that is adjacent to the windshield glass 300. The roof-storage-type sun visor 100 is configured such that the rear end of the housing 120 and the rear end of the sun visor are fastened to each other in the state in which the sun visor 200 is retracted.

In one embodiment, the sun visor 200 is provided at the rear end thereof with at least one receiving unit 173. The elastic member 170 corresponds to and is fastened to the receiving unit 173.

The elastic member 170 may include a spring 172 (shown in FIG. 5D) for providing elastic force and a latch 171 (shown in FIG. 5D) formed in a shape corresponding to the receiving unit 173. The latch 171 is fastened to the receiving unit 173.

When force pushing the elastic member 170 toward the rear of the vehicle is applied by the sun visor 200 in the state in which the sun visor 200 is retracted in the housing 120, the fixation of the latch 171 is released. The elastic force from the compressed spring 172 is transmitted to the sun visor 200.

In other words, at least a portion of the sun visor 200 protrudes outside the storage recess 110 due to the tensile force of the latch 171.

In contrast, when force pushing the elastic member 170 toward the rear of the vehicle is applied in the state in which the sun visor 200 is protruded, the latch 171 is fastened to the receiving unit 173. Additionally, the latch 171 is fixed in the state in which the spring 172 is compressed.

Figure 5B:
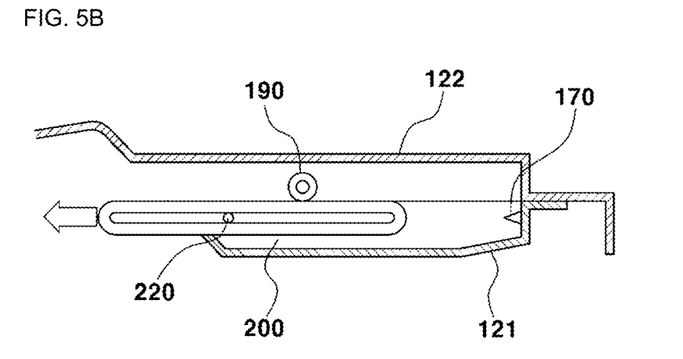
FIG. 5B is a side sectional view showing the roof-storage-type sun visor apparatus according to an embodiment of the present disclosure in which a portion of the sun visor is protruded.

FIG. 5B shows the state in which a portion of the sun visor 200 is protruded outside the storage recess 110 by the elastic force of the elastic member 170.

When the fastening between the elastic member 170 and the receiving unit 173 is released in the state in which the sun visor 200 is retracted into the housing 120, as shown, one end of the sun visor 200 protrudes outside the storage recess 110.

In an embodiment of the present disclosure, the elastic force of the elastic member 170 may be set such that the sun visor 200 protrudes at least 10 mm (about 0.39 inches).

When the sun visor 200 is withdrawn by the elastic member 170, the first rail 140 is moved into the storage recess 110 in the longitudinal direction of the housing 120 by the length that the sun visor 200 is withdrawn.

, In an embodiment of the present disclosure, when the sun visor 200 is withdrawn by the elastic member 170, the first rail 140 is located at the inner surface of the housing adjacent to the storage recess 110. One end of the first rail 140 is fastened to the fixing unit 180.

In addition, the first rail 140 may be moved such that an insertion region of the first rail 140 including a catching recess 164 (shown in FIG. 7) faces a hook unit 160 (shown in FIG. 7). The hook unit 160 is configured to limit the longitudinal movement of the first rail 140.

In brief, the first rail 140 may be configured to be moved toward the storage recess 110 by the elastic member 170, and the longitudinal movement of the first rail 140 is limited by the fixing unit 180 and the hook unit 160.

Figure 5C:
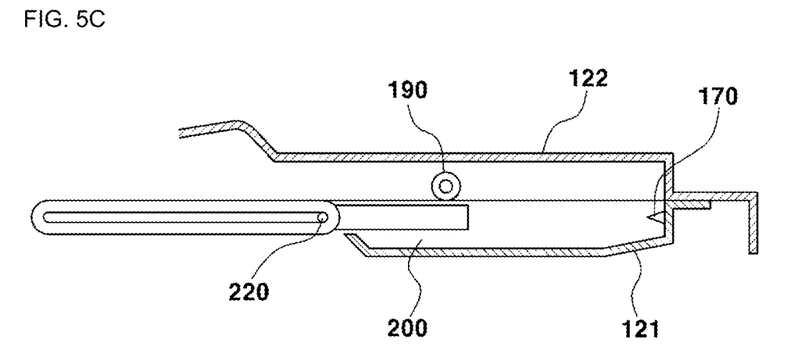
FIG. 5C is a side sectional view showing the roof-storage-type sun visor apparatus according to an embodiment of the present disclosure and in the state in which the sun visor is completely protruded.

FIG. 5C is a side view showing the state in which a portion of the sun visor 200 is completely protruded outside the storage recess 110.

As shown, the first rail 140 is configured to be located at the fixing unit 180 on the inner surface of the housing 120 adjacent to the storage recess 110. The second rail 150, which is fixed to the sun visor 200, is configured to further extend along the first hole 141 of the first rail 140 in the longitudinal direction thereof.

Consequently, the sun visor 200, which is fixed to the second rail 150, is completely protruded outside the storage recess 110.

The second rail 150 includes a rod configured to be moved along the first hole 141 formed in the first rail 140. The rod is configured to fix the sun visor 200 and the second rail 150 to each other. The rod is configured to simultaneously move the second rail 150 and the sun visor 200 along the first rail 140 in the longitudinal direction thereof.

The first rail 140 and the second rail 150 may be configured to be movable simultaneously or sequentially. When the sun visor 200 is withdrawn, the first rail 140 and the second rail 150 may be moved sequentially or simultaneously.

In the state in which the sun visor 200 is completely withdrawn, the front end of the first rail 140 is fastened to the fixing unit 180. Additionally, the hook unit 160 is fastened to the catching recess 164 of the first rail 140 on the upper surface of the first rail 140, whereby the longitudinal movement of the first rail 140 is limited.

Consequently, the second rail 150, which is located at the rear end of the first hole 141, may be integrally withdrawn along the first rail 140, and may be moved along the first hole 141 in the longitudinal direction of the vehicle in the state in which the longitudinal movement of the first rail 140 is limited such that the sun visor 200 extends.

The lengths of the first rail 140 and the first hole 141 may be set to correspond to the forward-rearward length of the sun visor 200.

The sun visor 200, a portion of which is withdrawn by the elastic member 170, may be further withdrawn by manipulation of the user, or driving force may be applied to the sun visor such that the sun visor is automatically further withdrawn.

Furthermore, in the case in which the withdrawn sun visor 200 is retracted into the housing 120, the sun visor may be manually or automatically retracted into the storage recess 110.

Figure 5D:
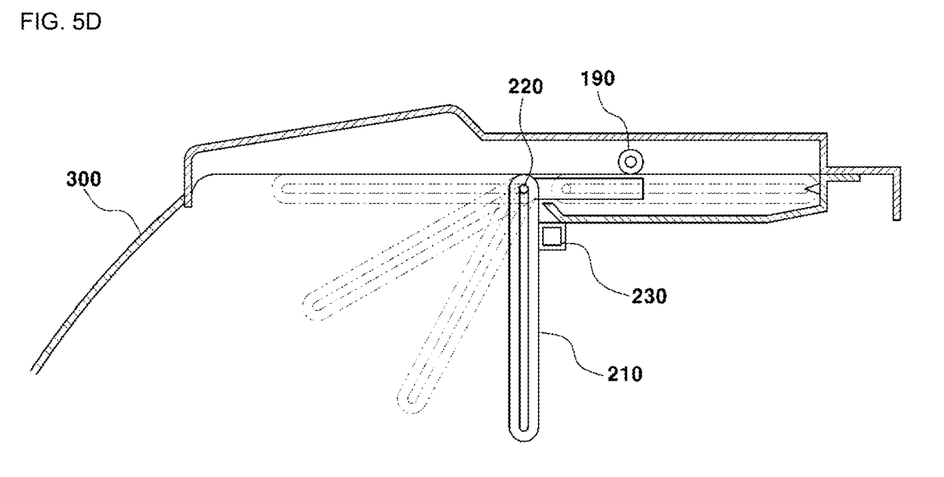
FIG. 5D is a side sectional view showing the roof-storage-type sun visor apparatus according to an embodiment of the present disclosure and in the state in which the sun visor is protruded and turned.

FIG. 5D is a side sectional view showing that the sun visor 200, withdrawal of which is completed, is turned about the central shaft 220.

In the case in which the sun visor 200 is completely withdrawn outside the storage recess 110, the sun visor 200 is manually or automatically turned in response to a user request. The sun visor 200 may be turned about the central shaft 220 by a predetermined angle.

Furthermore, the turning angle of the sun visor 200 is limited by the stopper 230, which is located at one side of the central shaft 220.

In an embodiment of the present disclosure, the sun visor 200 is configured to be turned about the central shaft 220. The sun visor may be configured to be rotated from the roof by up to 90 degrees.

Figure 6:
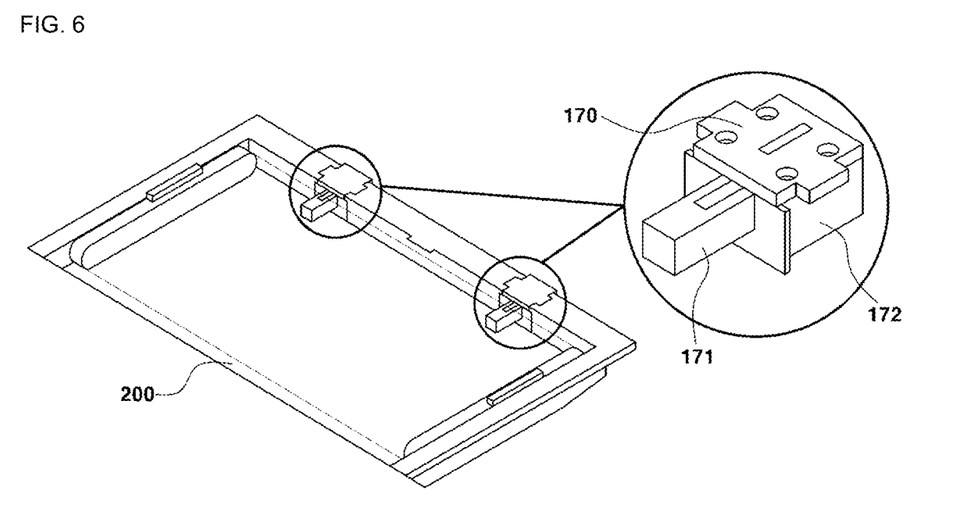
FIG. 6 is an enlarged view showing an elastic member according to an embodiment of the present disclosure and configured to protrude a portion of the sun visor.

FIG. 6 is an enlarged view showing the elastic member 170, which is located at the rear end of the housing 120.

As shown, the elastic member 170 includes a latch 171, and is configured such that the latch 171 applies tensile force through the spring 172, which is located inside the latch 171 in the longitudinal direction.

The end of the sun visor located inside the housing 120 is configured to face the latch 171. In one embodiment, a receiving unit 173 configured to be fastened to one end of the latch 171 is further included.

In an embodiment of the present disclosure, the receiving unit 173 is configured such that opposite sides of the latch 171 are fitted into the receiving unit 173. The receiving unit 173 is configured such that, in the case in which the sun visor 200 is pushed toward the rear end of the vehicle in the longitudinal direction thereof, opposite ends of the receiving unit 173 are selectively widened, whereby the fastening between the receiving unit 173 and one end of the latch 171 is released.

In the state in which the sun visor 200 is retracted into the housing 120 and is held in the housing, the latch 171 is retracted in the direction in which the spring 172 is compressed and is then fixed.

In the case in which tensile force is applied in the longitudinal direction of the sun visor 200 in the state in which the sun visor 200 is retracted in the housing 120, on the other hand, the latch 171 provides the elastic force of the compressed spring 172 toward the front of the vehicle, whereby the fastening with the receiving unit 173 is released.

As described above, the sun visor 200 is configured to be withdrawn outside the storage recess 110 by the elastic member 170. In an embodiment of the present disclosure, the sun visor 200 is configured to protrude from the storage recess 110 by 10 to 20 mm (about 0.30 inches to 0.80 inches) by the elastic force of the elastic member 170.

In the case in which the sun visor 200 is withdrawn by the elastic force of the elastic member 170, the front end of the first rail 140 faces the inside of the housing 120, in which the storage recess 110 is located. The front end of the first rail 140 is configured to be fastened to the fixing unit 180.

In addition, a fastening part 161 (shown in FIG. 7) of the hook unit 160 is configured to be fastened to the catching recess 164, which is located in the upper surface of the first rail 140. The fastening part 161 prevents the first rail 140 from being pushed toward the rear end of the housing 120 in the longitudinal direction thereof.

FIG. 7 shows the hook unit 160, which is configured to prevent the first rail 140 from being pushed toward the rear of the vehicle in the case in which the first rail 140 is located so as to abut one end of the inside of the housing, in which the storage recess 110 is located.

At least one hook unit 160 is located at the side end of the inside of the housing 120. The hook unit 160 is configured to include a catching recess 164 provided at the position at which the first rail 140 and the hook unit 160 face each other.

In the case in which the first rail 140 is moved to one end of the inner surface, which is adjacent to the storage recess 110, the catching recess 164 is fastened to the hook unit 160. The hook unit 160 may be located to fix the inside of the first rail 140 together with the fixing unit 180, which is located on the inner surface of the storage recess 110.

Consequently, the hook unit 160 is configured such that the first rail 140 is fixed to the catching recess 164 together with the fixing unit 180, which is located in front thereof. After the first rail 140 is moved to one end that is adjacent to the storage recess 110, the hook unit 160 may fix the first rail so as not to be inserted into the housing 120.

The hook unit 160 includes a fastening part 161 configured to be retracted into the inside of the catching recess 164 of the first rail 140 and an elastic part 162 (shown in FIG. 8A) for applying uniform tensile force such that the fastening part 161 is inserted into the catching recess 164.

In one embodiment, the elastic part 162 is configured to be located above the fastening part 161. The fastening part 161 moves into the catching recess 164 due to the weight thereof and at the same time the elastic force of the elastic part 162 may be applied thereto.

In addition, the hook unit 160 includes an inclined part 163 formed so as to be inclined in the longitudinal direction such that the inclined part faces the sun visor 200. The inclined part is located at the fastening part 161.

In other words, when the first rail 140 is moved so as to abut the inside of the storage recess 110, the fastening part 161, configured to be fastened to the catching recess 164, limits the movement of the first rail 140. In the case in which the sun visor 200 is retracted into the housing 120 and is stored in the housing, one end of the sun visor 200 that is retracted pushes the inclined part 163 of the fastening part 161 upwards, whereby the fastening between the fastening part 161 and the catching recess 164 is released.

Consequently, the fastening part 161 is fastened to the catching recess 164 by the weight of the fastening part 161 and the elastic force of the elastic part 162. One end of the sun visor 200 is retracted into the housing 120 along the inclined part 163, whereby the fastening between the fastening part 161 and the catching recess 164 is released.

Figure 8A:
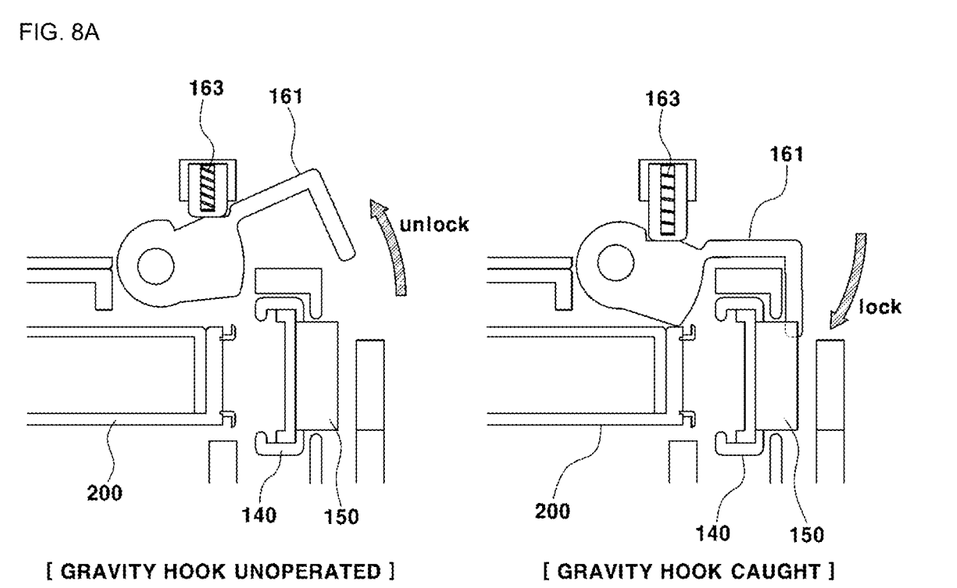
FIG. 8A is a sectional view taken along line A-A including the hook unit according to an embodiment of the present disclosure.

FIG. 8A is a sectional view of the hook unit 160 taken along line A-A, which shows the construction of the fastening part 161 that is inserted into the catching recess 164 of the first rail 140.

As shown, the hook unit 160 includes a fastening part 161 configured to be inserted into the catching recess 164. The fastening part 161 is configured to be turned upwards and downwards about a hinge located at one end thereof that is adjacent to the center of the housing 120 in the widthwise direction thereof.

An elastic part 162, configured to apply downward tensile force to the fastening part 161, is provided at the upper surface of the fastening part 161. In an embodiment of the present disclosure, the elastic part 162 may be a coil spring.

The fastening part 161 may abut one end of the sun visor 200 in the state of not being inserted into the catching recess 164 of the first rail 140 such that the first rail 140 is freely moved. In the case in which the sun visor 200 is withdrawn, the fastening part 161 freely moves in the downward direction of the vehicle.

In the case in which the fastening part 161 faces a region of the first rail 140 at which the catching recess 164 is located when the fastening part 161 freely moves in the downward direction of the vehicle, the fastening part 161 is inserted into the catching recess 164 to limit the longitudinal movement of the first rail 140.

In one embodiment, in the case in which the fastening part 161 is fastened to the inside of the catching recess 164, one end of the fastening part 161 that faces the first rail 140 is turned about the shaft in the widthwise direction of the vehicle. The fastening part 161 is inserted into the catching recess 164 located at the upper surface of the first rail 140.

In an embodiment of the present disclosure, a protruding region may be provided at the upper surface of the first rail 140, and an insertion region of the fastening part 161 including the catching recess 164 may be provided in the rear end of the protruding region. When the first rail 140 is moved to one end thereof adjacent to the storage recess 110, the insertion region may be located so as to face the fastening part 161.

Consequently, the longitudinal movement of the first rail 140 may be limited such that the first rail 140 is not pushed toward the rear of the vehicle through the fastening between the fastening part 161 and the catching recess 164.

Figure 8B:
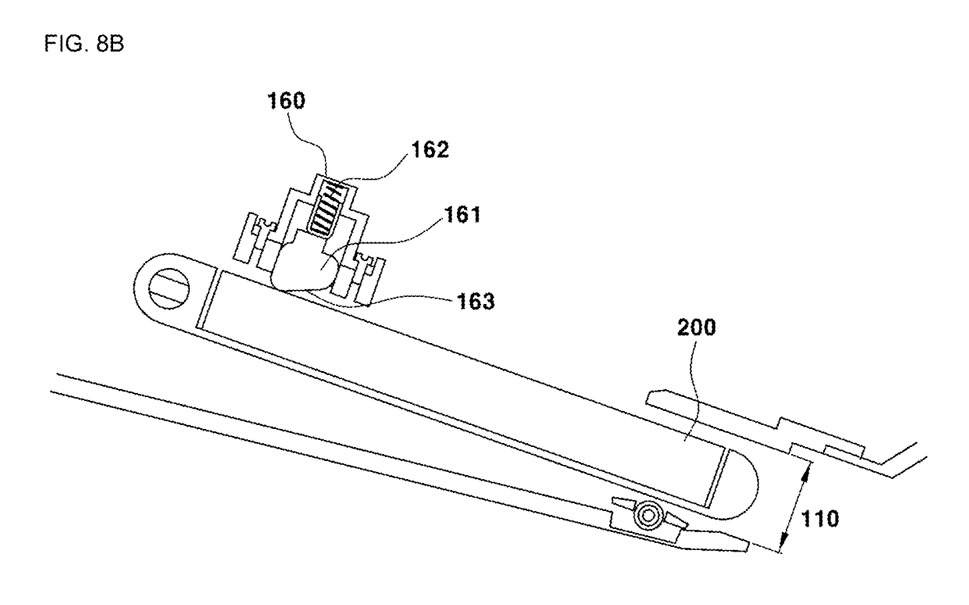
FIG. 8B is a sectional view taken along line B-B including the hook unit according to an embodiment of the present disclosure.

FIG. 8B is a sectional view taken along line A-A of FIG. 7, which shows the construction of the inclined part 163 configured to face one end of the sun visor 200.

In an embodiment of the present disclosure, the hook unit 160 is located at each side of the upper surface of the housing 120 so as to be adjacent to the upper surface of the first rail 140. Furthermore, the fastening part 161 of the hook unit 160 is located so as to abut the upper surface of the first rail 140 and is configured to be inserted into the catching recess 164 of the first rail 140 at a region at which the catching recess 164 is located.

In addition, the hook unit 160 according to the present disclosure may be a gravity hook. Consequently, at least a portion of the hook unit 160 is inserted into the catching recess 164 at a region of the hook unit that faces the catching recess 164 due to the weight thereof.

Moreover, the elastic part 162, which provides tensile force in the downward direction of the vehicle, is located above the fastening unit 161. Consequently, the fastening part 161 may be configured to be inserted into the catching recess 164 by the elastic part 161 and gravity at a region of the fastening part that faces the catching recess 164.

The fastening part 161 includes an inclined part 163, the height of which is gradually increased from the front to the rear of the vehicle. The inclined part 163 is located so as to be adjacent to one end of the sun visor 200.

In addition, when the sun visor 200 is retracted into the housing 120, the inclined part 163 abuts one end of the sun visor 200. In the case in which the sun visor 200 is further inserted into the housing 120 in the state in which one end of the sun visor 200 abuts the inclined part 163, the fastening part 161 moves in the height direction of the vehicle due to the height difference of the inclined part 163, whereby the fastening with the catching recess 164 is released.

In the case in which the sun visor 200 is retracted into the housing 120, the fastening part 161, including the inclined part 163, moves in the height direction of the vehicle. Therefore, the fastening between the first rail 140 and the fastening part 161 is released, whereby the first rail 140 is moved toward the rear of the housing 120.

In brief, the inclined part 163 is located so as to abut the sun visor 200 in the state in which the sun visor 200 is retracted into the housing 120. The fastening part 161 remains raised in the height direction.

In the case in which the sun visor 200 is withdrawn along the storage recess 110, on the other hand, the inclined part 163 and the sun visor 200 are spaced apart from each other. The fastening part 161 is located so as to be adjacent to the first rail 140 due to the weight thereof and the elastic force of the elastic part 162.

Furthermore, in the case in which the first rail 140 is located inside the housing 120 adjacent to the storage recess 110, the fastening part 161 may be inserted into the catching recess 164 due to the weight thereof and the elastic force applied thereto.

As described above, the present disclosure provides a roof-storage-type sun visor 100 having an elastic member 170 for moving a sun visor 200. The roof-storage-type sun visor 100 also includes a fastening part 161 and a fixing unit 180 for fixing a first rail 140 depending on the position at which the sun visor 200 is withdrawn, whereby the sun visor is prevented from being exposed to the interior of the vehicle.

As is apparent from the foregoing, the present disclosure may have the following effects from the construction, coupling, and use relationships of the embodiments of the present disclosure.

The present disclosure provides a sun visor configured not to be exposed to the interior of a vehicle when stored, whereby it is possible to provide more enhanced riding comfort.

In addition, the present disclosure provides a sun visor configured to be withdrawn in response to a user request, whereby the possibility of damage to the sun visor is reduced.

The effects of the present disclosure are not limited to those mentioned above. It should be understood that the effects of the present disclosure include all effects that can be inferred from the foregoing description of the present disclosure.

The above detailed description illustrates the present disclosure. In addition, the foregoing describes embodiments of the present disclosure. The present disclosure may be used in various different combinations, changes, and environments. In other words, variations or modifications can be made within the conceptual scope of the present disclosure, equivalents to the disclosure of the present disclosure, and/or the scope of technology and knowledge in the art to which the present disclosure pertains. The embodiments describe examples for realizing the technical concept of the present disclosure. Variations required for the concrete application and use of the present disclosure are possible. Therefore, the above detailed description does not limit the present disclosure disclosed above. In addition, the appended claims should be interpreted to include other embodiments.

What is claimed is:

1. A sun visor apparatus comprising:
    a housing located inside a roof of a vehicle, the housing having therein a storage recess; and
    a sun visor unit configured to be disposed along the storage recess,
    wherein the sun visor unit includes,
        a sun visor located so as to correspond to a windshield glass, and
        multi-stage rails located at opposite sides of the sun visor,
    wherein the sun visor is configured to be withdrawn outside the storage recess along the multi-stage rails, and
    wherein each of the multi-stage rails includes,
        a first rail configured to be moved in a longitudinal direction of the housing, and
        a second rail fixed to the sun visor, the second rail being located between the first rail and an inner surface of the housing, the second rail being configured to extend along the first rail.

2. The sun visor apparatus according to claim 1, further comprising at least one elastic member located at an inner surface of the housing that faces one end of the sun visor.

3. The sun visor apparatus according to claim 1, further comprising at least one roller unit located at an inner surface of the housing at a position thereof that faces the sun visor.

4. The sun visor apparatus according to claim 1, wherein the second rail is configured to be moved integrally with the sun visor along a first hole provided in the first rail.

5. The sun visor apparatus according to claim 1, wherein the second rail is provided at one end thereof with a central shaft configured to extend through the sun visor, and the sun visor is configured to be turned about the central shaft.

6. The sun visor apparatus according to claim 5, wherein the central shaft has a stopper configured such that the sun visor is turned by a predetermined angle.

7. The sun visor apparatus according to claim 1, further comprising a fixing unit located at one end of the first rail that faces the storage recess, wherein the fixing unit is configured to fix the first rail to one end of an inside of the storage recess.

8. The sun visor apparatus according to claim 1, further comprising a hook unit located at the housing, wherein the hook unit is configured to be fastened to at least a portion of each of the multi-stage rails.

9. The sun visor apparatus according to claim 8, wherein the hook unit comprises:
    a fastening part configured to be fastened to each of the multi-stage rails;
    an elastic part configured to provide uniform elastic force to the fastening part; and
    an inclined part located at the fastening part, the inclined part being configured to abut at least a portion of the sun visor,
    wherein, when one end of the sun visor contacts the inclined part, coupling between the fastening part and the multi-stage rail is released.

10. The sun visor apparatus according to claim 1, wherein the housing comprises an upper housing and a lower housing, the lower housing forming a roof lining.

11. The sun visor apparatus according to claim 1, further comprising a holding unit located at one surface of the sun visor for holding a portable device.

12. A sun visor apparatus comprising:
    a housing located inside a roof of a vehicle, the housing having therein a storage recess;
    a sun visor unit configured to be disposed along the storage recess; and
    a hook unit located at the housing,
    wherein the sun visor unit includes,
        a sun visor located so as to correspond to a windshield glass, and
        multi-stage rails located at opposite sides of the sun visor,
    wherein the sun visor is configured to be withdrawn outside the storage recess along the multi-stage rails, and
    wherein the hook unit is configured to be fastened to at least a portion of each of the multi-stage rails.

13. The sun visor apparatus according to claim 12, wherein the hook unit comprises:
    a fastening part configured to be fastened to each of the multi-stage rails;
    an elastic part configured to provide uniform elastic force to the fastening part; and
    an inclined part located at the fastening part, the inclined part being configured to abut at least a portion of the sun visor,
    wherein, when one end of the sun visor contacts the inclined part, coupling between the fastening part and the multi-stage rail is released.

* * * * *